May 30, 1961
A. R. CLARK ET AL  2,986,135
STARTING MECHANISM FOR INTERNAL COMBUSTION ENGINES
Filed May 11, 1959  2 Sheets-Sheet 1
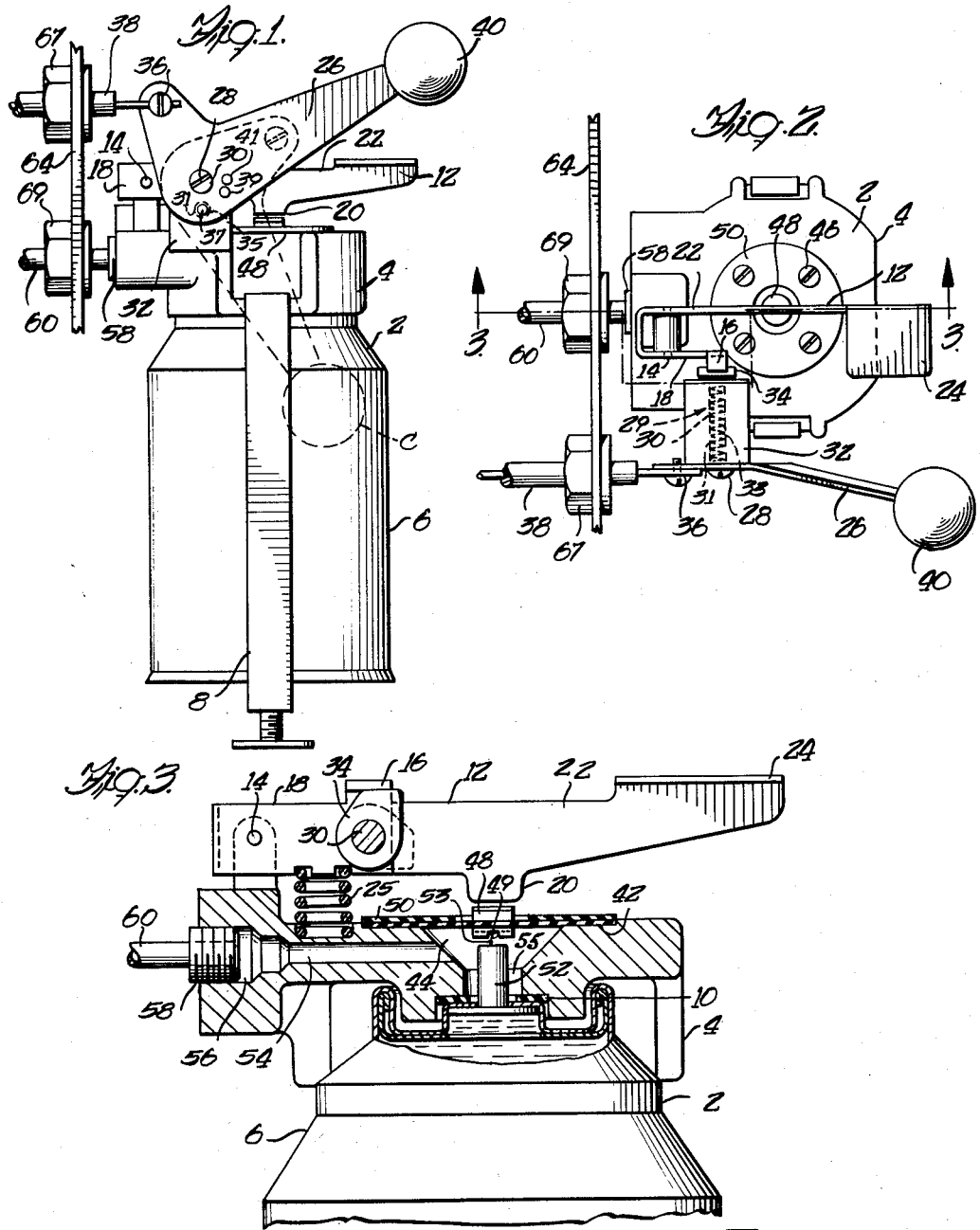
INVENTORS
ADNA R. CLARK
GEORGE E. COLEMAN
Paul O. Pippel
ATTORNEY

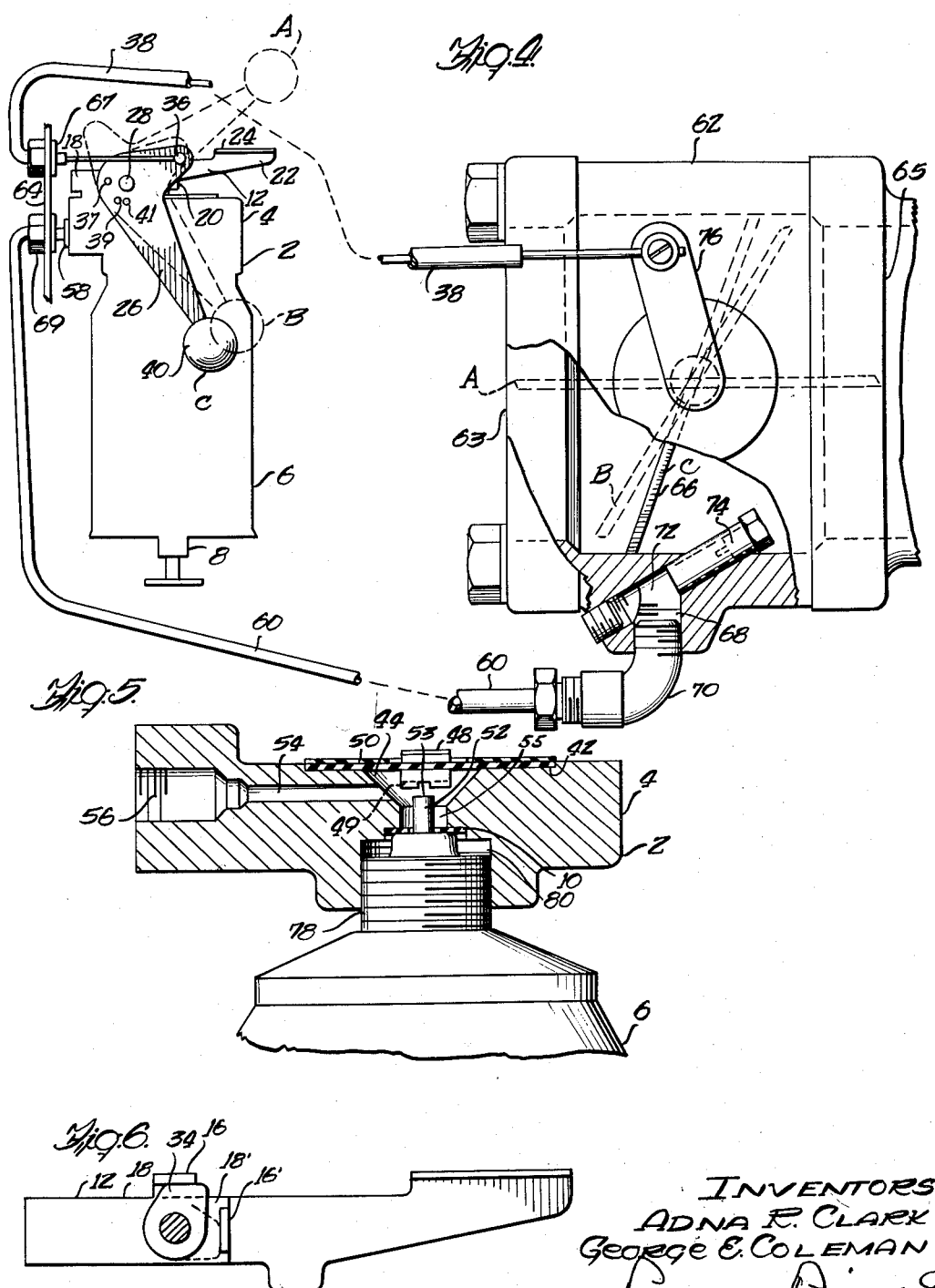

United States Patent Office 2,986,135
Patented May 30, 1961

2,986,135

STARTING MECHANISM FOR INTERNAL COMBUSTION ENGINES

Adna R. Clark, Fort Wayne, Ind., and George E. Coleman, Elmhurst, Ill., assignors to International Harvester Company, Chicago, Ill., a corporation of New Jersey Filed May 11, 1959, Ser. No. 812,512

16 Claims. (Cl. 123—180)

This invention relates to an engine priming system and more particularly to a mechanism for supplying additional fuel into the engine intake manifold as required.

An object of this invention is to provide for injection of a highly volatile priming fuel into the intake manifold of an engine for cold starting of the engine.

Another object of the invention is to provide a fireproof closed priming fluid system to prevent the escape of priming fluid fumes.

Another object of the invention is to provide a priming fuel system which permits an operator to regulate the flow of the priming fluid into the intake manifold of an internal combustion engine in order to prevent damage to the engine when it is running under load.

A further object of the invention is to provide a fluid injection mechanism which is quickly attached or detached for use with an internal combustion engine.

A still further object of the invention is to provide a fluid injection mechanism having a large single source of fluid supply for many separate individual priming operations and being capable of use on internal combustion engines of different sizes.

A still further object is to provide a fluid injection mechanism which is operable only when the air supply in the intake manifold is reduced.

A still further object is to provide a fluid injection mechanism wherein interlocking means on the injection body partially close the manifold butterfly valve to restrict the flow of air to an internal combustion engine and operate a valve on a source of highly volatile fluid to allow the fluid to enter the engine to aid cold starting of the engine.

These and other objects of the invention will become more apparent from the specification and drawings wherein:

Figure 1 is an elevational view illustrating the fluid injection mechanism having an intake butterfly valve actuating linkage and a fluid supply line.

Figure 2 is a plan view of the fluid injection mechanism shown in Figure 1.

Figure 3 is an elevational view of part of the fluid injection mechanism illustrating in cross section the injector body taken substantially along the line 3—3 of Figure 2.

Figure 4 illustrates the connection of actuating linkage and the fluid supply line between the fluid injection mechanism and the intake manifold of an internal combustion engine which is partly in section.

Figure 5 is a modification of the fluid injection mechanism shown in Figure 1.

Figure 6 is a further modification of the fluid injection mechanism illustrating an alternative lever construction.

Describing the invention in detail and having particular reference to Figures 1 through 4, there is shown a fluid injection mechanism or applicator 2 comprising an injector body 4 and a pressurized priming fluid source or can 6 of the "aerosol" type containing a highly volatile fluid such as ether. The can 6 is tightly secured to the body 4 by means of bail 8, and a seal or gasket 10 is positioned between the body 4 and the can 6 to prevent leakage of the ether from the can 6.

A J-shaped manually operated lever 12 is pivotally attached to the body 4 at pivot point 14 and has a cam engaging surface or lip 16 on the upper side of its shorter arm 18, a button engaging surface or boss 20 on the underside of its longer arm 22, and a hand engaging surface 24 on the upper side of the longer arm 22. A spring 25 is fastened and seated on the upper outer side of the body 4 and contacts the underside of the shorter arm 18 urging the lever 12 upwardly into an out-of-use position.

A bell crank lever or L-shaped handle 26 is fixedly attached at 28 to a shaft 30 rotatably mounted within the boss 32 which is integral with the body 4. The shaft 30 is attached at its other end to a lip engaging means or lock means or cam 34. The position of handle 26 is set by a detent means 29 which consists of a bore 31 through the boss 32, the bore housing a spring 33 which at one of its ends seats against the cam 34 to keep it in place flush against the side of lever 12 and at its other end holds a detent ball 35 engageable in holes 37, 39 or 41 in the handle 26 to lock the handle 26 in position A, B, or C respectively, as shown in Figures 1 and 4.

The handle or lever 26 has a connection point 36 at one end for receiving a linkage in the form of a Bowden wire 38 of conventional construction and at the other end of the handle 26 is formed a ball shaped nob 40 graspable by an operator for shifting the handle 26 into a fully opened or an engine running position A, partially opened or ether injection position B, or a closed or engine shut-off position C as seen in Figure 4.

The center portion of the outer upper side surface of the body 4 has a flexible diaphragm 42 stretched across a funnel shaped opening in the body 4 forming a chamber or passageway 44 and is secured to the body 4 by screws 46. A button 48 having slots 49 in its underside acting as ether fluid passages is centrally disposed within and attached to the diaphragm 42 beneath the boss 20 and a washer 50 seals the diaphragm 42 to the injector body 4. A valve 52 of the conventional form used on an "aerosol" type can having an ether fluid exhaust port 53 and capable of releasing fluid under pressure in a conventional manner is positioned on top of the can 6 and projects through an inlet port 55 of the body 4 into the chamber 44 from the underside of the body 4 and a passage, conduit or channel 54 medially located within one side of the body 4 joins the outer portion of the chamber 44 with the fluid exhaust or outlet port 56 which is threaded and receives an externally threaded coupling 58 holding the fluid or gas line 60 leading to the fuel supply system or the hollow intake manifold 62 of an internal combustion engine (not shown). The wire 38 and the hose 60 of ether applicator 2 may be attached to the firewall 64 or elsewhere of a vehicle (not shown) by fastening means 67 and 69 respectively, which attachment also rigidly positions the applicator 2 with respect to the firewall 64.

The intake manifold 62 having an inlet end 63 and an outlet end 65 is of conventional construction and has a fuel supply system conditioning means butterfly valve 66 rotatably disposed within it between a source of air and the cylinders (not shown) of the internal combustion engine. An internally threaded bore or inlet port 68 is located on the intake manifold 62 near the butterfly valve 66 between the valve 66 and outlet end 65 and receives an externally threaded nozzle 70 containing the extension of the line or hose 60 from the body 4. A passage or channel 72 communicatively connects the inlet port 68 with the interior of the manifold 62 between the butterfly valve 66 and the cylinders of the engine. An atomizer 74 of conventional construction, is placed in the passage 72 where the passage 72 enters the interior of the manifold 62 to diffuse or spray the fluid as it enters the manifold 62. The wire 38 leading from the handle 26 is pivotally connected to an arm 76 rigidly connected to the butterfly valve 66.

Operation

The addition of ether vapor into the combustion chamber of an engine will give the added power necessary for cold starting the engine where temperatures are as low as —65° F. However, since introduction of ether increases the power output of the engine, such increase could be harmful to the engine and therefore the injection of ether into the engine should be regulated. Our invention accomplishes this by manually depressing the handle 26 which rotates the cam 34 into the position shown in dotted lines in Figure 3 while at the same time pulls the wire 38 to the right, as seen in Figure 1, which causes the butterfly valve 66 to move counterclockwise from position A (Figure 4) where the butterfly valve 66 is fully open to position B (Figure 4) where the butterfly valve 66 is only partially open. This occurs as the handle 26 moves from position A to position B as seen in Figure 4. Shifting the handle 26 and consequently the valve 66 to position B reduces the amount of air passing through the intake manifold 62 to the engine and reduces the engine potential output. Further movement of the handle 26 to position C (see Figure 1) shifts the valve 66 to position C (See Figure 4) terminating all flow of air to the combustion chamber of the engine. It will be appreciated that the positions A, B, and C are shown for purposes of illustration and that actual positioning of the valve 66 to restrict the flow air may range anywhere between almost fully open and fully closed understanding that a certain amount of valve closure should occur when the cam 34 is rotated pursuant to movement of handle 26 from its locked position against the lip 16 to the dotted position shown in Figure 3 to permit downward movement of the lever 12 movement of lever 12 being impeded by the cam 34 when the handle is in position A.

Next the lever 12 is manually depressed and contacts the button 48 and deflects the diaphragm 42 down so that button 48 contacts and presses the valve 52 down and allows ether fluid under pressure to escape from the pressurized can 6 by way of the outlet port 53 through the passages 49 into the chamber 44 into passage 54 and discharge port 56 through the hose 60 into the nozzle 70 and passage 72 of the intake manifold 62 through the atomizer 74 into the interior of the intake manifold 62 and hence to the cylinders of the internal combustion engine. It will be noted that ether flows in a closed well sealed passage from the can 6 to the cylinder and thus none of the ether fumes are exposed outside of the sealed passageway to create a fire hazard.

Under this arrangement the operator cannot accidently depress the lever 12 until the handle 26 is sufficiently rotated to unseat the cam 34 and therefore when the butterfly valve 66 is fully open ether can not be improperly injected into the engine cylinder thus avoiding damaging the engine by use of too powerful of an explosive mixture.

The combination of the handle 26, the detent means 29, the cam 34, the lever 12 and the linkage 38 constitutes an interlock means between the valve 66 (Figure 4) and the valve 52.

A modification as shown in Figure 5 illustrates that the pressurized can 6 has an exteriorally threaded nozzle portion 78 which is threaded into an interiorly threaded recess 80 in the injector body 4. This type of connection between the can and the body eliminates the use of a bail 8 as shown in Figure 1.

As seen in a further modification illustrated in Figure 6, the handle 26 and the lever 12 may be so constructed that movement of the handle 26 is able in a single operation to move the lever 12 to permit ether to enter the intake manifold 62 as the handle 26 also unseats the cam 34 and actuates the butterfly valve 66 such as by putting an additional cam engaging surface or lip 16' on the face 18' of the shorter arm 18 of the lever 12 perpendicular to surface 16 so that the cam 34 being journaled to the handle 26 will move the lever 12 when engaging such lip 16' downward to release the ether upon further downward movement of the handle 26 and thus the lever 12 need not be moved later in a second step by the operator.

It is to be noticed that the valve 52 when depressed inwardly towards the can 6 permits escape of the ether but once the lever 12 is permitted to return to its out-of-use position as shown in Figure 3 and therefore letting valve 52 return to its closed position, the remaining ether is once again sealed under pressure to be used for future injections. This design has the advantage of performing many single ether injections until the ether content is completely used as distinguished from the type of design where a single vial or bulb of ether under pressure is perforated to expel all of its contents for a single injection of ether and then the bulb is discarded and a new bulb of ether must be used for a second injection. Thus many vials or bulbs must be used for multiple injections wherein our invention a single pressurized can 6 of ether is able to service many injections regardless of the quantity of ether required and regardless the size of the engine to be serviced.

Thus it will be seen that a simple, novel and effective structure is provided and it will be understood that the form of the invention as illustrated is intended as a disclosure and not a limitation as other forms will become readily apparent within the scope of the appended claims.

What is claimed is:

1. A starting aid for an internal combustion engine having an intake manifold having inlet and outlet ends, the combination of a first valve means in said manifold intermediate said ends, a source of highly volatile fluid operatively connected to the manifold intermediate said valve means and outlet end and including a second valve means for closing and opening said source to communication with respect to said manifold, and interlocking means operatively interconnecting said first valve means with said second valve means and having means locking the second valve against accidental opening from its closed position in the substantially open position of the first valve and unlocking the second valve in its closed position with attendant movement of the first valve to the substantially closed position.

2. A starting aid for an engine having an intake manifold, the combination of a first valve in said manifold, a source of highly volatile fluid operatively connected to the manifold adjacent said first valve and including a second valve for closing and opening said source to communication with respect to said manifold, and interlocking means operatively interconnecting said first valve with said second valve and having means locking the second valve against accidental opening while said second valve is held in its closed position and unlocking said second valve means while said second valve is held in its closed position with attendant movement of the first valve in the direction of the closed position.

3. A starting aid for an internal combustion engine having an intake manifold having inlet and outlet ends, the combination of a first valve in said manifold intermediate said ends, a fluid injector mechanism operatively connected to the manifold and comprising a source containing a highly volatile fluid and including a second valve communicable with the manifold intermediate said first valve and said outlet, and operating means operatively connected with said source for opening and closing said second valve, and handle means operatively connected to said first valve and having a stop in the path of movement of the operating means disengageably locking said operating means as the handle means holds the first valve in a substantially open position.

4. A starting aid for an internal combustion engine having an intake manifold, having inlet and outlet ends, the combination of a first valve in said manifold intermediate said ends, a fluid injector mechanism operatively connected to the manifold and comprising an injector body having conduit means communicating with the first valve and a source containing a highly volatile fluid and including a second valve communicating with the body, operating means attached to the body including a lever to engage said second valve, handle means connected to the first valve and attached to said body and having disengageable lock means positioned in the path of movement of said lever to prevent engagement of the lever with the second valve concurrently with the movement of the handle means to the substantially open position of the first valve.

5. A starting aid for an internal combustion engine having an intake manifold having inlet and outlet ends, the combination of a first valve in said manifold intermediate said ends, a fluid injector mechanism operatively connected to the manifold and comprising an injector body provided with a chamber and a source containing a highly volatile fluid under pressure and including a second valve thereon projecting into the chamber, a diaphragm positioned on the body and covering the chamber and having a button projecting through, a lever connected to said body to engage said button for actuating said second valve and having a cam engaging surface, handle means mounted to the injector body and having a cam thereon for engagement with said surface to prevent movement of the lever, conduit means communicating the chamber with the manifold intermediate said first valve and said outlet end, and linkage connecting the first valve with the handle means.

6. A starting aid for an internal combustion engine having an intake manifold having inlet and outlet ends, the combination of a first valve in said manifold intermediate said ends, said manifold having an inlet port therein intermediate said valve and said outlet end, a fluid injection mechanism operatively connected to the manifold and comprising an injector body provided with a chamber and an outlet port in communication with the chamber and an applicator can containing a highly volatile fluid under pressure and having a second valve thereon projecting into the chamber, a diaphragm positioned on the body and covering the chamber and having a button projecting through, a lever pivotally connected to said body adapted to engage said button to actuate said second valve and having a cam engaging surface, resilient means disposed between the body and the lever for holding the lever out of engagement with said button, handle means pivotally mounted to the injector body and having a cam thereon for engagement with said surface to prevent movement of the lever, conduit means communicating said outlet port with said inlet port, and linkage connecting the first valve with the handle means, said handle means positioning said first valve while permitting the lever to allow fluid communication between the can and the manifold.

7. A starting aid for an internal combustion engine having an intake manifold having inlet and outlet ends, the combination of a first valve in said manifold intermediate said ends, said manifold having an inlet port therein intermediate said valve and said outlet end, a fluid injection mechanism operatively connected to the manifold and comprising an injector body provided with a chamber and an outlet port in communication with the chamber and an applicator can containing a highly volatile fluid under pressure and having a second valve thereon projecting into the chamber, a diaphragm positioned on the body covering the chamber and having a button projecting through and fixedly secured thereto, a spring biased lever pivotally connected to said body and having a lip and having a boss adapted to engage said button to actuate said second valve, handle means pivotally mounted to the injector body and having a cam thereon for engagement with said lip to prevent movement of the lever, and resiliently loaded detent means between said handle and said cam to position the handle means and to urge the cam against the lever, conduit means communicating said outlet port with said inlet port, and linkage connecting the first valve with the handle, said handle means positioning said first valve while permitting the lever to allow fluid communication between the can and the manifold.

8. A starting aid for an internal combustion engine having an intake manifold and comprising an injector body provided with a chamber and a passageway extending from one side of the injector body to the chamber, a diaphragm means positioned against one face of said body over the chamber and secured to the injector body and having button means projecting through it and being fixedly secured thereto, a lever pivotally mounted on the injector body and having lip means and having a boss thereon adapted to engage said button means, resilient means disposed between the body and the lever for holding the boss out of engagement with said button means, handle means pivotally mounted on the injector body and having lip engaging means secured thereto, a container for said body and holding starting fluid under pressure and having a valve thereon being disposed in the chamber, means removably holding the container in engagement with the body, a manifold valve pivotally mounted in the intake manifold, a conduit extending from the passageway in said body to said manifold adjacent the manifold valve, and an operating connection extending from the handle means to the manifold valve.

9. A starting aid for an internal combustion engine having an intake manifold having inlet and outlet ends, the combination of a first valve pivotally mounted in said manifold intermediate said ends, said manifold having a fluid inlet port therein intermediate said valve and said outlet end, a fluid injection mechanism operatively connected to the manifold and comprising an injection body having sides, a top, and a bottom and provided with a chamber and outlet port extending from one side of the body to the chamber and an applicator can containing a highly volatile fluid under pressure and having a second valve thereon projecting into the chamber from the bottom of the body, a diaphragm secured to the top of said body covering said chamber and having a valve button projecting through and fixedly secured thereto, said button having passage means communicating with said second valve, a lever pivotally connected to said body and having a shorter arm having a lip and a longer arm having a boss adapted to engage said button to actuate said second valve, resilient means disposed between the body and the lever for holding the boss out of engagement with said button, handle means pivotally mounted to the injector body and having a cam thereon for engagement with said lip to prevent movement of the lever, and resiliently loaded detent means between said handle means and said cam to position the handle means and to urge the cam against the lever, means removably holding the cam in engagement with the body, conduit means communicating said outlet port with said inlet port, and linkage connecting the first valve with the handle means, said handle means positioning said first valve while permitting the lever to allow fluid communication between the can and the manifold.

10. A starting aid for an internal combustion engine having an intake manifold having inlet and outlet ends, the combination of a butterfly valve rotatively pivotally mounted in said manifold intermediate said ends, said manifold having an ether inlet port therein intermediate said valve and said outlet end, ether atomizing means within said port, an ether injection mechanism operatively connected to the manifold and comprising an injection body having sides, top, and a bottom and provided with a chamber and outlet port extending from one side of the body to the chamber, an applicator can containing ether under pressure and having an applicator valve thereon projecting into the chamber from the bottom of the body, a flexible diaphragm secured to the top of said body and stretching over and covering said chamber and having a button projecting through and fixedly secured thereto, said button having passage means communicating said chamber with said applicator valve, a manually operated lever pivotally connected to said body and having a shorter arm having a lip and a longer arm having a boss adapted to engage said button to actuate said applicator valve, spring means disposed between the body and the lever for holding the boss out of engagement with said button, handle means pivotally mounted to the injection body and having a cam secured thereto for engagement with the lip to prevent movement of said lever, and spring loaded detent means between said handle means and said cam to position the handle means and to urge the cam against the lever, means removably holding the can in engagement with the body, conduit means connecting the outlet port of the body to the inlet port of the manifold, and a linkage extending from the handle to the butterfly valve, said handle means opening the butterfly valve and unlocking the lever to open the applicator valve for ether communication between the can and the intake manifold.

11. An injection means for a starting aid of an internal combustion engine comprising an injection body having a side, a top, and a bottom, a chamber within said body, a flexible diaphragm positioned on the top of said body and sealingly covering said chamber and having a button means thereon projecting into the chamber, an outlet port extending from said side to the chamber, and an applicator can containing a highly volatile fluid under pressure and having a valve thereon projecting into the chamber from the bottom of the body for contact with said button, said engine having a throttle valve operating mechanism including a member releasably positioned in the path of movement of the button means in open throttle position of the mechanism to prevent accidental opening of said valve.

12. A fluid injection means for a starting aid of an internal combustion engine comprising an injector body having a chamber therein and having a fluid exhaust port communicating with the chamber, a diaphragm positioned on the body covering the chamber, a button projecting through and supported by said diaphragm, and a fluid source having a valve thereon projecting into the chamber in actuating relation with the button, said engine having a throttle valve operating mechanism including a member releasably positioned in the path of movement of the button in open throttle position of the mechanism to prevent accidental opening of said valve.

13. An injection means for a starting aid of an internal combustion engine comprising a body having inlet and exhaust ports and having a chamber therein, said body having an open side communicating with the chamber, contact means mounted on the body covering said open side, and a fluid source attached to the body and having a valve extending into said inlet port for engagement with said means, said engine having a throttle valve operating mechanism including a member releasably positioned in the path of movement of the contact means in open throttle position of the mechanism to prevent accidental opening of said valve.

14. In a device of the class described, the combination of valve means comprising a body having inlet and discharge ports for connection respectively to an associated fuel supply system, a valve carried by the body for controlling said inlet port, control means operatively associated with said body and comprising first and second levers, fuel supply system conditioning means operatively connected to said first lever; means operatively associated with the second lever for opening and closing said valve attendant to movement of said second lever independent of the movement of the first lever, interlocking means connected to said first lever and movable thereby into locking and releasing positions with respect to the second lever whereby movement of said second lever independently of the movement of the first lever is a function of the position of said first lever.

15. In a device of the class described, the combination of valve means comprising a body having inlet and discharge ports for connection respectively to an associated fuel supply system, a valve carried by the body for controlling said inlet port, control means operatively associated with said body and comprising first and second levers, fuel supply system conditioning means operatively connected to said first lever; means operatively associated with the second lever for opening and closing said valve attendant to movement of said second lever independent of the movement of the first lever, interlocking means connected to said first lever and movable thereby into locking and releasing positions with respect to the second lever whereby movement of said second lever independently of the movement of the first lever is a function of the position of said first lever, said interlocking means comprising cam means disposed in obstructing relation to the movement of said second lever.

16. In a device of the class described, the combination of valve means comprising a body having inlet and discharge ports for connection respectively to an associated fuel supply system, a valve carried by the body for controlling said inlet port, control means operatively associated with said body and comprising first and second levers, fuel supply system conditioning means operatively connected to said first lever; means operatively associated with the second lever for opening and closing said valve attendant to movement of said second lever independent of the movement of the first lever, interlocking means connected to said first lever and movable thereby into locking and releasing positions with respect to the second lever whereby movement of said second lever independently of the movement of the first lever is a function of the position of said first lever, said interlocking means comprising a shaft connected to said first lever and a cam connected to the shaft, said second lever having a lip in contacting relation by the cam, said cam being movable to released and locking positions with respect to the lip to permit actuation of said second lever.

References Cited in the file of this patent

UNITED STATES PATENTS

| 1,124,949 | Raymond | Jan. 12, 1915 |
| 1,331,853 | Sitzler | Feb. 24, 1920 |
| 1,993,925 | Fitzgerald | Mar. 12, 1935 |
| 2,597,776 | Chandler | May 20, 1952 |
| 2,704,536 | Edwards | Mar. 22, 1955 |
| 2,706,977 | Pritchard | Apr. 26, 1955 |
| 2,862,491 | Burack | Dec. 2, 1958 |